(12) United States Patent
Browne et al.

(10) Patent No.: US 8,656,713 B2
(45) Date of Patent: Feb. 25, 2014

(54) ACTIVE MATERIAL-BASED IMPULSE ACTUATORS

(75) Inventors: Alan L. Browne, Grosse Pointe, MI (US); Nilesh D. Mankame, Ann Arbor, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 645 days.

(21) Appl. No.: 12/607,989

(22) Filed: Oct. 28, 2009

(65) Prior Publication Data

US 2011/0094215 A1    Apr. 28, 2011

(51) Int. Cl.
*F01B 29/10* (2006.01)
*F02G 1/04* (2006.01)
*F41B 7/00* (2006.01)

(52) U.S. Cl.
USPC .................. 60/527; 124/17; 60/528; 60/529

(58) Field of Classification Search
USPC ..................................... 60/527–529
See application file for complete search history.

(56) References Cited

U.S. PATENT DOCUMENTS

| | | | | |
|---|---|---|---|---|
| 3,595,213 A | * | 7/1971 | Storer | 124/17 |
| 3,987,777 A | * | 10/1976 | Darlington | 124/25.6 |
| 4,662,344 A | * | 5/1987 | Mitchell | 124/22 |
| 5,671,722 A | * | 9/1997 | Moody | 124/22 |
| 5,673,677 A | * | 10/1997 | Wing | 124/20.3 |
| 5,961,069 A | * | 10/1999 | Perrier | 244/63 |
| 6,052,992 A | * | 4/2000 | Eroshenko | 60/509 |
| 6,616,129 B1 | * | 9/2003 | Lee | 254/266 |
| 6,886,622 B2 | * | 5/2005 | Villhard | 164/98 |
| 6,925,671 B1 | * | 8/2005 | Mouton | 15/104.062 |
| 6,969,920 B1 | * | 11/2005 | Severinghaus | 290/1 R |
| 7,305,824 B1 | * | 12/2007 | Barvosa-Carter et al. | 60/527 |
| 7,456,698 B2 | * | 11/2008 | Gianchandani et al. | 331/154 |
| 7,895,836 B2 | * | 3/2011 | Hamaguchi | 60/528 |
| 2003/0019210 A1 | * | 1/2003 | Gummin et al. | 60/528 |
| 2006/0202512 A1 | * | 9/2006 | Brei et al. | 296/187.04 |
| 2006/0208609 A1 | * | 9/2006 | Heim | 310/311 |
| 2007/0175213 A1 | * | 8/2007 | Featherstone et al. | 60/527 |
| 2007/0246979 A1 | * | 10/2007 | Browne et al. | 297/216.12 |
| 2008/0176143 A1 | * | 7/2008 | Inada et al. | 429/331 |
| 2008/0197674 A1 | * | 8/2008 | Browne et al. | 296/193.11 |
| 2008/0227060 A1 | * | 9/2008 | Esashi et al. | 434/113 |
| 2008/0252116 A1 | * | 10/2008 | Phillips | 297/217.1 |

* cited by examiner

*Primary Examiner* — Thomas Denion
*Assistant Examiner* — Brian Inacay

(57) ABSTRACT

An apparatus for and method of displacing a body, such as a projectile, piston, or the distal edge of a sunshade cover or energy absorbing honeycomb matrix, utilizing momentum generated by the rapid actuation of an active material element, such as a Martensitic shape memory alloy wire.

21 Claims, 3 Drawing Sheets

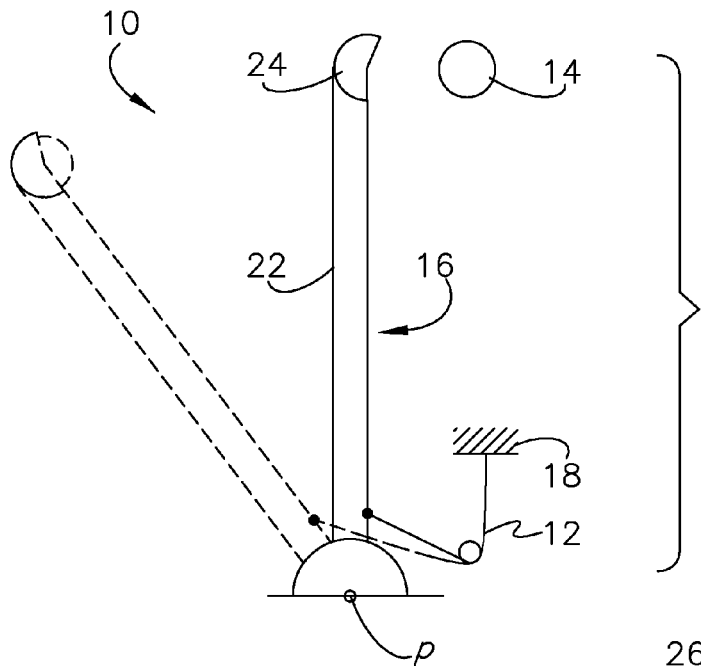
FIG. 1
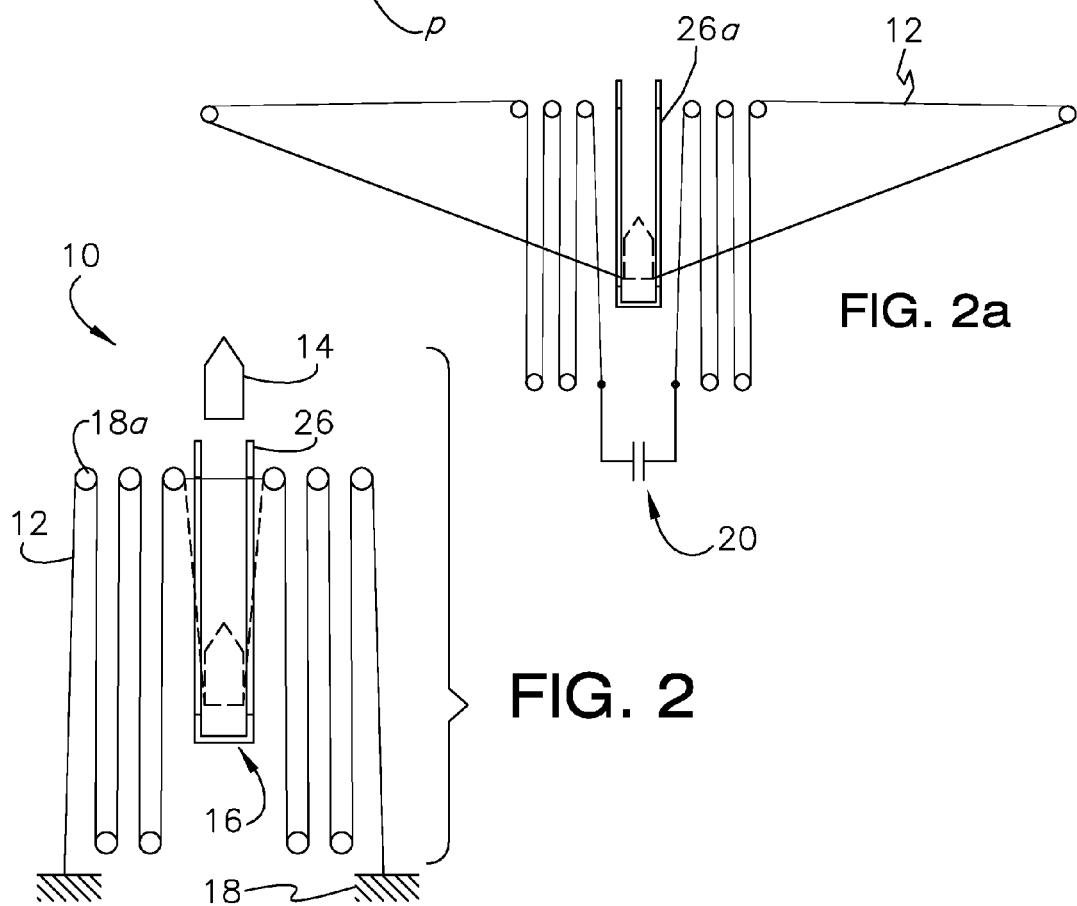
FIG. 2a
FIG. 2

ACTIVE MATERIAL-BASED IMPULSE ACTUATORS

1. TECHNICAL FIELD

This disclosure generally relates to actuators for and methods of displacing a body (e.g., object, mass, etc.); and more particularly, to an actuator that utilizes momentum generated by rapid active material actuation to impart kinetic energy to a body and thereby displace the body, and to an apparatus comprising and methods employing the same.

2. BACKGROUND ART

Conventional methods for imparting kinetic energy in and/or displacing a body over a large distance include the release of stored energy, such as in stretched elastomeric bands, compressed springs, pyrotechnics, and the like, and the performance of work by electromechanical and electrohydraulic drives. These methods, however, present various limitations and concerns, including, for example, those relating to mass, packaging, complexity, and robustness.

Currently, active-material based actuators, including those comprising SMA wires, cables, bars, etc., are used to directly drive a body, or release a holding mechanism so as to allow stored energy to act upon the body. Whereas SMA actuators address the afore-mentioned concerns, they are currently limited to providing at most 8% displacement (i.e. 8% of their length) in a single actuation cycle. To achieve large displacements requires a large linear length of SMA material, which in many applications is prohibitive due to packaging considerations. As such, in order to achieve displacements greater than that which is allowed by the wire length, complex transmissions and/or amplifying mechanisms, including gears, levers, pulleys, and the like, have been employed. However, the inclusion of these measures re-introduces at least some of the afore-mentioned concerns.

BRIEF SUMMARY

In response to these concerns, the present invention recites an apparatus for and method of displacing a body, such as a piston or projectile, a first distance through the rapid activation of an active-material actuator, such as a shape memory alloy wire or dielectric elastomer diaphragm or tendon, wherein the first distance is greater than the displacement experienced by the wire itself. In a preferred embodiment, the invention utilizes the shape memory effect in SMA to impart kinetic energy to a body or mass with which it is in physical contact. The invention is therefore useful for providing a means for displacing a body that reduces mass, packaging requirements, complexity, and noise (both acoustic and EMF) in comparison to conventional counterpart devices and systems.

A first aspect of the invention concerns an apparatus adapted to perform work, and comprising an active material element securely connected to a fixed structure, and operable to undergo a reversible fundamental change when exposed to and/or occluded from an activation signal, so as to be activated and deactivated respectively. At least a portion of the element is caused to travel a first distance, as a result of the change. The apparatus further includes a body located at a first position, and translatable over a second distance greater than the first distance, so as to achieve a second position. The portion of the element is in physical communication with, and operable to transfer kinetic energy to the body, so as to cause the body to travel the second distance, as a result of the change.

The inventive apparatus may be used in various applications including to fully deploy a sunshade, displace a headrest, deploy an energy-absorbing member, and articulate a piston within a cylinder. Other aspects and advantages of the present invention will be apparent from the following detailed description of the preferred embodiment(s) and accompanying drawing figures.

BRIEF DESCRIPTION OF THE SEVERAL VIEWS OF THE DRAWING

A preferred embodiment of the invention is described in detail below with references to the attached drawing figures of exemplary scale, wherein:

FIG. 1 is an elevation of a catapult comprising a shape memory wire actuator, in pre-activated (hidden-line type) and post-activated (solid-line type) conditions, in accordance with a preferred embodiment of the invention;

FIG. 2 is an elevation of a sling shot comprising a shape memory wire actuator presenting a bowstring configuration, in pre-activated (hidden-line type) and post-activated (solid-line type) conditions, in accordance with a preferred embodiment of the invention;

FIG. 2a is an elevation of a slingshot wherein the bowstring configuration presents a preferred height-hypotenuse ratio;

DETAILED DESCRIPTION OF THE PREFERRED EMBODIMENTS

Figure 3A:
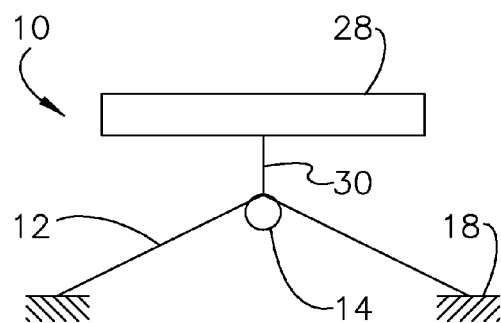
FIG. 3a is an elevation of an energy absorption system comprising a shape memory wire actuator in a bowstring configuration and a deployable honeycomb matrix in a stowed condition, in accordance with a preferred embodiment of the invention.

The present invention concerns a system 10 for doing work, which utilizes an active material actuator 12 to impart kinetic energy to (and more particularly, an impulse or change in momentum) upon a translatable body (or "mass") 14, wherein the momentum is operable to cause the body 14 to travel a distance greater than the displacement directly exhibited by activation of the active material (FIGS. 1-5c). Thus, the inventive system 10 is operable to achieve large displacements utilizing, for example, shape memory effect, far greater than the shape memory effect itself can directly provide. The system 10 may be adapted for use in a variety of applications, including, for example, the deployment of a sunshade or energy absorption member as illustrated and discussed herein, the displacement of a headrest (e.g., in case of rear impact with excessive head clearance), as weaponry, and wherever active material actuation and displacement greater than that which is directly exhibited thereby are desired.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include, but are not limited to, shape memory alloys (SMA), and ferromagnetic SMA's. Other suitable active materials include electrostrictives, magnetostrictives, electroactive polymers (EAP), electrorheological (ER) and magnetorheological (MR) materials, dielectric elastomers, piezoelectric polymers, various combinations of the foregoing materials, and the like. The inventive system 10 is particularly suitable for use with shape memory alloy, as will be further described below.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be plastically deformed and upon exposure to some higher temperature will transform to an Austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical return force.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that Joule heating can be used to make the entire system electronically controllable. Stress induced phase changes in SMA are, however, two way by nature. That is to say, application of sufficient stress when SMA is in its Austenitic phase will cause it to change to its lower modulus Martensitic phase in which it can exhibit up to 8% "superelastic" deformation. Removal of the applied stress will cause the SMA to switch back to its Austenitic phase in so doing recovering its starting shape and higher modulus.

Ferromagnetic SMA's (FSMA's) are a sub-class of SMAs. These materials behave like the afore-described SMA materials that have stress or thermally induced phase transformation between Martensite and Austenite. Additionally FSMA's are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

II. Exemplary System Configurations and Methods of Use

Returning to FIGS. 1-5c, various systems 10 are shown generally including a momentum amplifying/kinetic energy imparting mechanism 16 in physical engagement with the body 14, and drivenly coupled to the actuator 12. In the illustrated embodiments, the actuator 12 includes at least one SMA wire in a normally Martensitic state, wherein the term "wire" shall be deemed to generally encompass other elongated elements or composites, including cables, ropes, chains, strips, rods, tubes, etc. More preferably, the actuator 12 includes a plurality of parallel wires. It is appreciated that activation of different subsets of wires 12 will impart different amounts of force and momentum, and therefore achieve different resultant displacements/body kinetic energies. Moreover, it is appreciated that in each of the embodiments listed, at least one end of the wire 12 is anchored to fixed structure 18 (which may further be manually controlled), so that momentum is able to completely transfer to/imparted in the body 14.

In each of the embodiments, the actuator (e.g., wire(s)) 12, throughout its functional length, is rapidly actuated, e.g., over a maximum period of (i.e., equal to or less than) one-tenth of a second, more preferably one-hundredths of a second, and most preferably, five-thousandths of a second, in order to rapidly accelerate the body 14. More preferably, the period of activation is minimized, so that the velocity or kinetic energy of the mass 14 is maximized at the end of actuation. Control parameters include, the magnitude of current, the rapidity of onset of the current, the angle of the bowstring, the length of wire, the number of wires, the diameter of the wires, the transformation delta T of the SMA actuator, the amount of starting pseudoelastic strain. Where the direction of displacement contains a vector component opposite gravity, it is appreciated that the stress developed in the wire(s) 12 is the sum of that related to countering gravity plus that due to accelerating (i.e. the inertia of) the mass 14 to which displacement is being imparted. Therefore, the percent of energy ultimately deliverable as useful work is proportionately reduced, such that excess deliverable force capacity in the SMA wire 12 over that necessary to balance gravity must be provided.

At normal operating temperatures, and where the SMA wire 12 presents a known mean cross-sectional area, the wire 12 is Joule heated by passing a predetermined current therethrough. For example, to achieve a 1 second activation time, where the wire diameter is 0.006 inches (i.e., 0.15 mm), a 650 mA current is preferably applied, and where the diameter is 0.015 inches (i.e., 0.38 mm), a 2500 mA current may be used; to achieve a 0.1 second activation time, 6.0 and 24 A currents may be applied; and to achieve a 0.01 second activation time, 40 and 160 A currents may be used, respectively. The process becomes progressively more adiabatic at the faster activation rates.

As such, the system 10 further includes a power or signal source 20 operable to generate, in the case of SMA, the necessary voltage and current to achieve rapid actuation. In a preferred embodiment, the source 20 includes a large capacitor having sufficient capacitance and intermittent working voltage rating (FIG. 2a). To prevent overheating, sensory feedback is preferably provided to determine the completion of the actuation cycle, and the system 10 is further configured to interrupt the source 20, so as to discontinue the signal, upon such determination. Alternatively, it is appreciated that a lighting strike abating system (not shown) may advantage the large quantities of current produced by the strike or alternatively proximate detonation of a pyrotechnic to actuate the system.

A first embodiment is shown in FIG. 1, wherein the system 10 presents a catapult. Here, the momentum transferring mechanism 16 includes a swing arm 22 that defines a functional length, and a pivot axis, p, at or near a fixed base 18. The arm 22 includes a body engaging section (e.g., a concavity) 24 preferably at the distal end thereof. As shown in hidden line type in FIG. 1, the swing arm 22 may be oriented in a deactivated state such that the free body (in this case a projectile) 14 is retained within the section 24 by gravity.

An SMA wire actuator 12 is drivenly coupled to the swing arm 22, preferably near the pivot axis, and operable to effect the rotational displacement of the arm 22. When, the actuator 12 is rapidly activated, it causes the arm 22 to swing through a preferably ninety-degree angle, imparting kinetic energy equal to one half the mass of the body multiplied by the square of the circumferential component of the velocity vector of the engaging section 24 (FIG. 1). The wire 12 preferably presents a bowstring configuration having a pre-activation height-hypotenuse ratio, so that the swing arm 22 is further accelerated, when the wire 12 is caused to contract. It is appreciated that the mass of the swing arm 22 and the kinetic energy associated therewith subtracts from the energy that can be imparted in the projectile 14, and as such minimization of the mass of the swing arm 22 thereby increases the kinetic energy and momentum transferred to the projectile 14. Upon activation, kinetic energy is transferred to the projectile 14 causing it to be hurled over a distance much greater than the change in length experienced by the wire 12 at the base 18, or the arc defined by the distal end of the arm 22.

Figure 3B:
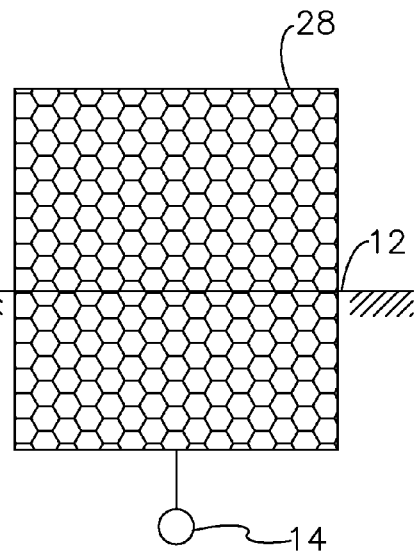
FIG. 3b is an elevation of the system shown in FIG. 3a, wherein the actuator has been activated and the matrix deployed.

Other "one-shot" activation examples are presented by the sling-shot, and energy-absorption systems 10 shown in FIGS. 2-3*b*. In FIG. 2, a sling shot 10 is presented comprising a momentum transferring mechanism 16 that includes a slotted bore 26 for guiding the body 14 (in this case a projectile). A shape memory wire actuator 12 is connected to fixed anchors 18 at both ends, and engages a projectile 14 in a bowstring configuration. The wire 12 may be doubled over at least once (via fixed points 18*a*), so as to present a functional length that, based on the available strain, is sufficient to cause acceleration of the projectile to occur over the full bore length (FIG. 2). As such, the bore 26 and wire 12 are cooperatively configured. The bore 26 preferably defines diametric slots 26*a* wherein the wire 12 is able to access the internal space defined thereby, engage the projectile 14, and translate. An intermediate pad (not shown) fixedly secured to the wire 12 may be used to more evenly transfer momentum to the projectile 14; however, it is appreciated that the added mass associated therewith will reduce the energy efficiency of the system 10 and available momentum. The wire 12 is preferably pseudoplastically pre-stretched prior to activation to effect a more instantaneous change in length.

In FIGS. 3*a,b*, an energy absorption system 10 comprises a shape memory wire actuator 12, and a selectively expandable honeycomb matrix 28 that is fixedly secured relative to a surface or space (not shown). Where expanded the matrix 28 is able to be readily deformed by an impacting object (also not shown), so as to absorb energy therefrom and mitigate damage to the object and/or surface or space. The wire 12 is drivenly coupled to the deployable honeycomb matrix 28 through an engaging body 14. More preferably, the body 14 presents a prong fixedly secured to a distal edge of the matrix 28; and may be interconnected by a tether 30 (FIG. 3*a*). The matrix 28 is longitudinally collapsed in the stowed condition, as shown in FIG. 3*a*.

When rapidly activated, the wire 12 drives the prong 14 and distal edge outward, accelerating it and transferring kinetic energy thereto, such that the prong 14 and edge continue to travel after the wire 12 has been fully activated, and preferably until completely expanding the honeycomb matrix, as shown in FIG. 3*b*. As such, the available momentum and length of the matrix are cooperatively configured. The wire 12 preferably presents a bowstring configuration having a pre-activation height-hypotenuse ratio, so that the body 14 is further accelerated, when the wire 12 is caused to contract.

Figure 4A:
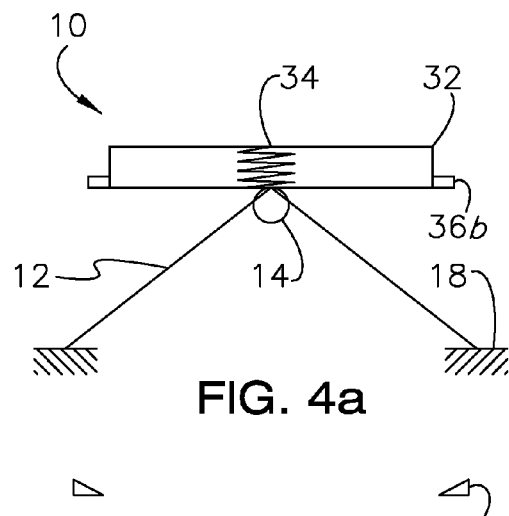
FIG. 4a is an elevation of a sunshade system comprising a shape memory wire actuator in a bowstring configuration, a deployable protective cover, and a locking mechanism, in a pre-activated and stowed condition, in accordance with a preferred embodiment of the invention.

In FIG. 4*a*, a multi-cycle sunshade system 10 comprises a shape memory wire actuator 12, and a selectively deployed protective cover 32 that is fixedly secured relative to a surface or space (not shown). When deployed, the cover 32 is operable to overlay the surface or space, for example, to block ultraviolet and/or otherwise radiant energy therefrom. The wire 12 is drivenly coupled to the deployable cover 32 through an engaging body 14. More preferably, the body 14 presents a prong fixedly secured to a distal edge of the cover 32 (FIG. 4*a*); or may be interconnected by a tether (not shown). In the stowed condition, the cover 32 may be rolled about a scroll (also not shown), retracted within a storage compartment, folded, or otherwise collapsed. Finally, a return mechanism 34 is preferably provided to bias the cover 32 towards the stowed condition (FIG. 4*a*). For example, an extension spring 34 may be connected to the edge such that the spring 34 is caused to store energy when the cover 32 is deployed (FIG. 4*b*); or similarly, a torsion spring may be coaxially aligned with and drivenly coupled to the scroll. As such, the actuator 12 is further configured to overcome the return mechanism 34.

Figure 4B:
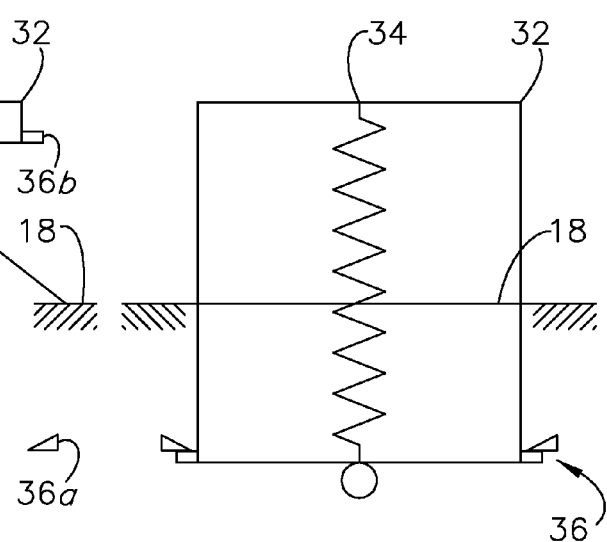
FIG. 4b is an elevation of the system shown in FIG. 4a, wherein the actuator has been activated, the cover deployed, and the latch engaged.

When rapidly activated, the wire 12 accelerates and drives the prong 14 and distal edge outward (i.e., away from the scroll) and transfers kinetic energy thereto, such that the prong 14 and edge continue to travel after the wire 12 has been fully actuated, and preferably until the cover 32 completely unwinds (FIG. 4*b*). Again, the wire 12 preferably presents a bowstring configuration having a pre-activation height-hypotenuse ratio, so that the body 14 is further accelerated, when the wire 12 is caused to contract.

As the cover 32 reaches the fully deployed state (i.e., the momentum/kinetic energy dissipates), a latch 36 is configured to engage the cover 32, and prevents it from returning to the stowed position. For example, and as shown in FIGS. 4*a,b*, first and second spring biased pawls 36*a* may be used to engage lateral members 36*b* fixedly attached to the edge. To stow the cover 32, the latch 36 is released (e.g., manually, via a conventional actuator, or by activating a separate active material actuator), so as to release the energy stored in the return mechanism 34. During its return, the prong 14 engages and preferably pre-stretches the actuator 12, so that the actuator 12 is ready for a subsequent activation.

Figure 5A:
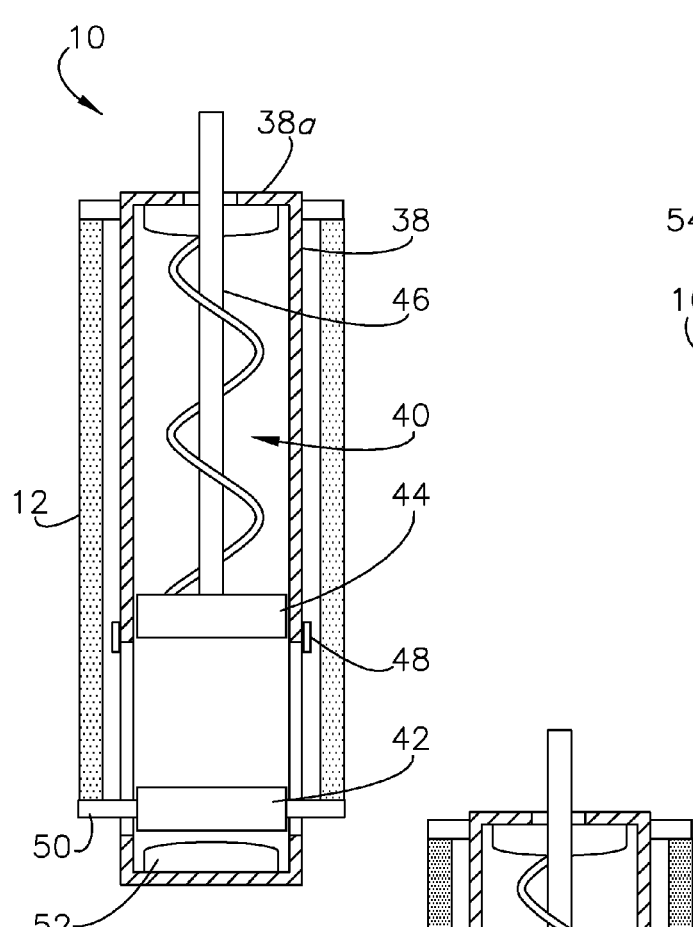
FIG. 5a is an elevation of an articulating system comprising an external cylinder, a plural shape memory wire actuator drivenly coupled to a driving mass translatably disposed within the cylinder, a translatable piston further including a driven piston head and rod also disposed within the cylinder, upper and lower dampers, a return spring and an adjustable hard stop, in a pre-activated condition, in accordance with a preferred embodiment of the invention.
Figure 5C:
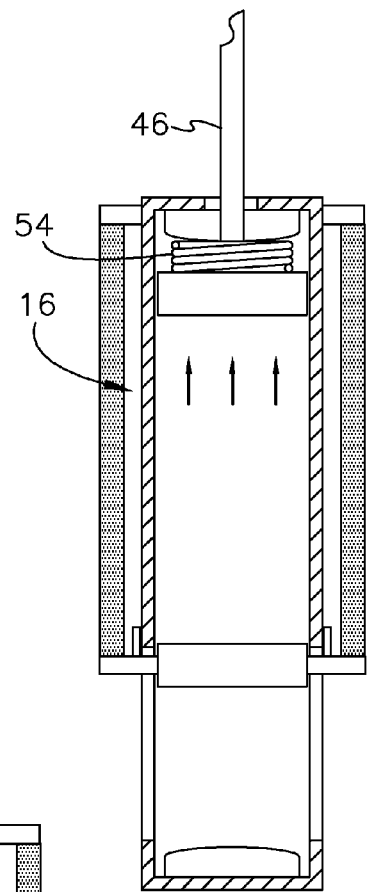
FIG. 5c is an elevation of the system shown in FIGS. 5a,b, wherein the head has been caused to translate within the cylinder and compress the return spring.
Figure 5B:
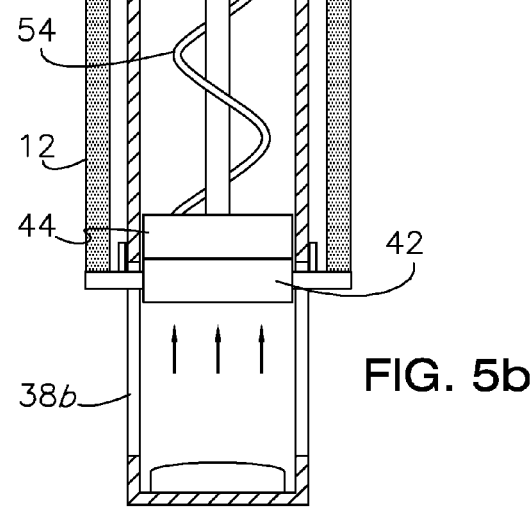
FIG. 5b is an elevation of the system shown in FIG. 5a, wherein the actuator has been activated so that the driving mass is caused to strike and transfer momentum to the piston head.

In FIGS. 5*a-c*, an articulating system 10 is adapted to drive an output, and comprises an external cylinder 38 defining a top cap 38*a*, and internally translating piston 40. The actuator 12 includes at least one, and more preferably a plurality of shape memory wires drivenly coupled to a driving mass 42. The mass 42 is translatably disposed within the cylinder 38 opposite and spaced from the piston 40. Alternatively, it is appreciated that the actuator may be directly coupled to the piston 40, wherein the mass 42 is omitted.

In the illustrated embodiment, the piston 40 further includes a driven piston head (or second mass) 44 and rod 46 disposed within the cylinder 38 opposite the mass 42. Adjusting the magnitudes of the masses 42,44 allows the nature of the output pulse (e.g., force and displacement vs. time) to be tuned. An adjustable hard stop 48 controls the stroke of the actuator 12 (i.e., the spacing between the masses 42,44), so as to enable tuning. The cylinder 38 defines a hole within the top cap 38*a* through which the rod 46 is translated. In FIGS. 5*a-c*, the wires 12 extend outside the cylinder 38; and as such, the cylinder 38 defines a plurality of slots 38*b*, through which a plurality of extensions 50 interconnect the wires 12 and driving mass 42. The length of the slots 38*b* is sufficient to accommodate the max expected stroke of the actuator 12. Alternatively, it is appreciated that the wire(s) 12 may be internally disposed within the cylinder 38.

In operation, the actuator 12 is rapidly activated, so that the wires 12 are caused to rapidly contract and the driving mass 42 to translate towards the second mass or piston head 44. Preferably, the wires 12, slots 38*b*, and the masses 42,44 are relatively positioned such that the masses 42,44 collide just before the wires 12 completely transform (FIG. 5*b*). This transfers the maximum momentum from the driving mass 42 to the head 44. The transfer of momentum causes the piston 40 to translate further up the cylinder 38 until the head 44 engages the cap 38*a* (FIG. 5*c*), thereby producing the output. After striking the head 44, the driving mass 42 falls back towards the home position (FIG. 5*a*) due to gravity. As the wires 12 cool, and deactivate, they are lengthened by the weight of the driving mass 42, and more preferably, exhibit two-way shape memory action, so as to accelerate the down stroke.

The preferred system 10 further includes at least one damper 52 to selectively engage the masses 42,44, at the distal ends of the cylinder 38 (FIGS. 5*a-c*). The dampers 52 are configured to absorb the impact of the masses 42,44, thereby mitigating vibration caused by the system 10. As such, the dampers 52 are formed of suitably compressible material. More preferably, the dampers 52 (and/or hard stop 48) may be formed of an active material (e.g. superelastic SMA, MR/ER, etc.), so as to present adjustable dampening characteristics, which enables the system 10 to be selectively attenuated.

To restore the system 10, a return mechanism 54 is drivenly coupled to the piston 40 antagonistically to the actuator 12. As shown in FIGS. 5*a-c*, the mechanism 54 may include a compression spring disposed within the cylinder 38, between the head 44 and top cap 38*a* and axially aligned with the rod 46. In this configuration, it is appreciated that the actuator 12 and source 20 are further configured to overcome and compress the spring 54 (FIG. 5*c*). A part of the work done by the actuator 12 is stored in the gravitational potential energy of the driving and driven masses 42,44; another part is stored in the return spring 54. These energies aid the return of the system 10 to its default configuration at the end of the actuation cycle. The return spring 54 preferably presents a relatively low stiffness, and may be used on either side of the cylinder 38. The spring 54 may also be formed of an active material, so as to enable further attenuation of the system 10. Alternatively, it is appreciated that the return mechanism 54 may be presented by gravity, a fluid pressure, and/or the down stroke of an adjacent and communicatively coupled piston (not shown), wherein the plural pistons form a unitary engine. Finally, if an oscillatory output force is undesirable, it is appreciated that a one-way locking mechanism (e.g., tilt washers or caulk gun locking mechanism) may be used, for example, where the rod 46 exits the cylinder 38.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Ranges disclosed herein are inclusive and combinable (e.g. ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g. the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. An apparatus adapted to perform work, and comprising:
   an active material actuator securely connected to a fixed structure, and operable to undergo an instance of a reversible change in shape when exposed to and/or occluded from an activation signal, so as to be activated and deactivated respectively, wherein the instance of the change in shape causes at least a portion of the actuator to travel a first distance;
   a body located at a first position, drivenly communicating with the actuator and separable from the actuator, and translatable over a second distance greater than the first, so as to continue to travel separate from the actuator after the actuator has been fully activated in order to achieve a second position; and
   a signal source communicatively coupled to the actuator, and operable to cause the instance of the change in shape over a maximum period, said at least the portion and the source being cooperatively configured to transfer a minimum momentum to the body, so as to impart an impulse upon the body and transfer kinetic energy to the body that cause the body to travel the second distance, as a result of the instance of the change in shape.

2. The apparatus as claimed in claim 1, wherein the actuator includes at least one Martensitic shape memory alloy wire.

3. The apparatus as claimed in claim 1, wherein the actuator includes at least one dielectric elastomer actuator.

4. The apparatus as claimed in claim 2, wherein the wire presents a bowstring configuration having a maximum height to hypotenuse ratio.

5. The apparatus as claimed in claim 1, wherein the body composes a stowed sunshade, and the actuator is operable to selectively deploy the sunshade when activated.

6. The apparatus as claimed in claim 1, wherein the body is connected to a collapsed deformation energy absorber, the actuator is operable to selectively cause the absorber to expand, as a result of the instance of the change in shape, and the momentum is transferred to the body as a result of causing the absorber to expand.

7. The apparatus as claimed in claim 1, further comprising:
   a return mechanism drivenly coupled to the body, exerting a force antagonistic to the momentum, and operable to cause the body to translate back to the first position, when the body is in the second position.

8. The apparatus as claimed in claim 7, further comprising:
   a locking mechanism configured to autonomously engage and retain the body at the second position.

9. The apparatus as claimed in claim 7, wherein the return mechanism is a spring, gravity, fluid pressure, or output of an adjacent system.

10. The apparatus as claimed in claim 9, wherein the return mechanism is a spring consisting of an active material.

11. The apparatus as claimed in claim 1, wherein the actuator includes a plurality of parallel shape memory alloy wires operable to create kinetic energy in, through the rapid acceleration of, the body, and activating differing subsets of the wires causes the body to travel over differing second distances and/or at differing velocities, so as to achieve differing second positions and/or differing second position velocities.

12. The apparatus as claimed in claim 1, wherein the body is a piston; and wherein the apparatus further includes a solid mass fixedly coupled to said at least portion of the actuator and operable to strike the piston when the actuator is activated.

13. The apparatus as claimed in claim 12, wherein the mass and piston are coaxially aligned with, and translatably disposed within a cylinder, the mass interconnects a plurality of shape memory elements externally disposed relative to the cylinder, and the cylinder defines at least one slot in a side of the cylinder so as to enable interconnection between the mass and elements.

14. The apparatus as claimed in claim 13, wherein the second distance defines a resultant stroke length, and at least one stop inter-engages the piston and cylinder and is operable to adjust the first position and stroke length.

15. The apparatus as claimed in claim 13, further comprising:
at least one damper fixedly secured relative to the cylinder, and operable to selectively engage the piston or mass and damp out vibrations arising from translating the piston and/or mass.

16. The apparatus as claimed in claim 15, wherein said at least one damper consists of an active material operable to attenuate the vibrations.

17. The apparatus as claimed in claim 1, further comprising:
an activation source operable to deliver a minimum activation signal to the actuator over a maximum period, so as to effect a rapid activation.

18. The apparatus as claimed in claim 17, wherein the source includes a capacitor presenting a minimum rating based on the cross-sectional area of the actuator.

19. A method of displacing a body a first distance, comprising the steps of:
a. activating at least one shape memory alloy element physically communicating with the body and securely connected to a fixed structure, over a maximum period;
b. causing a shape memory effect within the element, wherein at least a portion of the element is caused to travel a second distance less than the first, as a result of activating the element;
c. imparting kinetic energy to the body, as a result of causing the shape memory effect; and
d. displacing the body separate from the element as a result of imparting kinetic energy thereto, the body continuing to travel separate from the element after the element has been fully activated in order to achieve the first distance.

20. The method as claimed in claim 19, wherein step a) further includes the steps of pre-straining the element prior to activation.

21. The method as claimed in claim 19, wherein the element presents a Martensitic shape memory alloy wire having a mean cross-sectional diameter equal to 0.15 mm, and step a) further includes the steps of Joule heating the element by passing a 650 mA current through the element.

* * * * *